United States Patent
Baumgarte et al.

(10) Patent No.: US 12,100,205 B2
(45) Date of Patent: Sep. 24, 2024

(54) TECHNOLOGIES FOR LEVERAGING MACHINE LEARNING FOR CUSTOMIZED INSTALLATION OF ACCESS CONTROL HARDWARE

(71) Applicant: Schlage Lock Company LLC, Carmel, IN (US)

(72) Inventors: Joseph W. Baumgarte, Carmel, IN (US); Manfred E. Steffes, Colorado Springs, CO (US); Justin K. Robinson, Saint Cloud, FL (US); Justin W. Fox, Westland, MI (US); David O'Neill, Wingdale, NY (US); George R. Zechman, III, Dickson, TN (US)

(73) Assignee: Schlage Lock Company LLC, Carmel, IN (US)

( * ) Notice: Subject to any disclaimer, the term of this patent is extended or adjusted under 35 U.S.C. 154(b) by 382 days.

(21) Appl. No.: 17/018,595

(22) Filed: Sep. 11, 2020

(65) Prior Publication Data
US 2022/0083776 A1    Mar. 17, 2022

(51) Int. Cl.
*G09B 19/00* (2006.01)
*G06F 3/14* (2006.01)
(Continued)

(52) U.S. Cl.
CPC .............. *G06V 20/20* (2022.01); *G06F 3/14* (2013.01); *G06N 20/00* (2019.01); *G06T 7/0002* (2013.01); *G06T 7/70* (2017.01); *G09B 5/06* (2013.01); *G09B 19/003* (2013.01); *G06T 2207/10016* (2013.01); *G06T 2207/20081* (2013.01)

(58) Field of Classification Search
CPC ...... G09B 5/06; G09B 19/003; G06T 7/0002; G06T 7/70; G06T 2207/10016; G06T 2207/20081; G06N 20/00; G06F 3/14
See application file for complete search history.

(56) References Cited

U.S. PATENT DOCUMENTS

| 2012/0197600 A1* | 8/2012 | Bai .................... G08B 13/1968 703/2 |
| 2017/0280332 A1* | 9/2017 | Chatelain .............. H04W 16/18 |

(Continued)

FOREIGN PATENT DOCUMENTS

| CN | 108109167 A * | 6/2018 | ............. G06T 17/00 |

OTHER PUBLICATIONS

International Search Report; International Searching Authority; International Patent Application No. PCT/US2021/050033; dated Dec. 16, 2021; 2 pages.

(Continued)

*Primary Examiner* — Kang Hu
*Assistant Examiner* — Correll T French
(74) *Attorney, Agent, or Firm* — Taft Stettinius & Hollister LLP (57) ABSTRACT

A method of customized installation of access control hardware according to one embodiment includes capturing, by a camera of a mobile device, at least one image of an installation location for the access control hardware, generating a set of customized installation instructions for the access control hardware at the installation location based on the at least one image, and displaying the customized installation instructions on a graphical user interface of the mobile device.

20 Claims, 3 Drawing Sheets

(51) Int. Cl.
    *G06N 20/00*     (2019.01)
    *G06T 7/00*     (2017.01)
    *G06T 7/70*     (2017.01)
    *G06V 20/20*     (2022.01)
    *G09B 5/06*     (2006.01)

(56) References Cited

U.S. PATENT DOCUMENTS

| | | | |
|---|---|---|---|
| 2019/0385373 A1* | 12/2019 | Mittleman | G06T 15/30 |
| 2020/0128171 A1* | 4/2020 | Herson | H04N 5/23222 |
| 2020/0242799 A1 | 7/2020 | Huh | |
| 2021/0037174 A1* | 2/2021 | Meganathan | H04N 21/41407 |
| 2021/0071440 A1* | 3/2021 | Saeedi | G07C 9/00309 |
| 2021/0133450 A1* | 5/2021 | Nakayama | G06K 7/1417 |

OTHER PUBLICATIONS

Written Opinion; International Searching Authority; International Patent Application No. PCT/US2021/050033; dated Dec. 16, 2021; 4 pages.

* cited by examiner

TECHNOLOGIES FOR LEVERAGING MACHINE LEARNING FOR CUSTOMIZED INSTALLATION OF ACCESS CONTROL HARDWARE

BACKGROUND

Technicians and end users often rely on printed installation instructions for the installation of access control hardware such as door locks, strike plates, hinges, and other hardware components. Because of the static nature of such instructions, they typically cover the nominal instruction case. As such, technicians and end users may turn to web videos and/or blogs in an effort to troubleshoot technical issues or installation circumstances that fall outside of the norm. However, even those videos are static in nature and often fail to address the unique circumstances encountered by the technician or end user.

SUMMARY

One embodiment is directed to a unique system, components, and methods for leveraging machine learning for the customized installation of access control hardware. Other embodiments are directed to apparatuses, systems, devices, hardware, methods, and combinations thereof for leveraging machine learning for the customized installation of access control hardware.

According to an embodiment, a method of customized installation of access control hardware may include capturing, by a camera of a mobile device, at least one image of an installation location for the access control hardware, generating a set of customized installation instructions for the access control hardware at the installation location based on the at least one image, and displaying the customized installation instructions on a graphical user interface of the mobile device.

In some embodiments, the method may further include transmitting, by the mobile device, the at least one image to a server, wherein generating the set of customized installation instructions may include generating the set of customized installation instructions by the server, and the method may further include transmitting the set of customized installation instructions from the server to the mobile device.

In some embodiments, generating the customized installation instructions may include analyzing the at least one image based on machine learning.

In some embodiments, analyzing the at least one image may include determine whether a hardware template is in a proper location at the installation location based on the at least one image.

In some embodiments, analyzing the at least one image may include determining whether an existing hole pattern at the installation location is compatible with a retrofit access control hardware component based on the at least one image.

In some embodiments, analyzing the at least one image may include determining at least one of a door thickness or a backset at the installation location based on the at least one image.

In some embodiments, analyzing the at least one image may include determining a proper electrical wiring configuration at the installation location for the access control hardware based on the at least one image.

In some embodiments, analyzing the at least one image may include determining a wireless communication environment of a physical environment of the installation location based on the at least one image.

In some embodiments, analyzing the at least one image may include determining one or more access control hardware components of a plurality of access control hardware components captured in the at least one image to use for a particular installation step of the access control hardware.

In some embodiments, capturing the at least one image may include capturing video of the installation location.

According to another embodiment, a system may include a camera configured to capture at least one image of an installation location for access control hardware and a mobile device comprising a processor and a memory having a plurality of instructions stored thereon that, in response to execution by the processor, causes the mobile device to receive the at least one image of the installation location captured by the camera, generate a set of customized installation instructions for the access control hardware at the installation location based on the at least one image, and display the customized installation instructions on a graphical user interface of the mobile device.

In some embodiments, the system may further include a server configured to receive the at least one image captured by the camera via the mobile device, generate the set of customized installation instructions for the access control hardware, and transmit the set of customized installation instructions to the mobile device for display on the graphical user interface.

In some embodiments, to generate the customized installation instructions may include to analyze the at least one image to determine whether a hardware template is in a proper location at the installation location.

In some embodiments, to generate the customized installation instructions may include to analyze the at least one image to determine whether an existing hole pattern at the installation location is compatible with a retrofit access control hardware component.

In some embodiments, to generate the customized installation instructions may include to analyze the at least one image to determine at least one of a door thickness or a backset at the installation location.

In some embodiments, to generate the customized installation instructions may include to analyze the at least one image to determine a proper electrical wiring configuration at the installation location for the access control hardware.

In some embodiments, to generate the customized installation instructions may include to analyze the at least one image to determine a wireless communication environment of a physical environment of the installation location.

According to yet another embodiment, a mobile device may include a camera configured to capture at least one image of an installation location for access control hardware, a processor, and a memory having a plurality of instructions stored thereon that, in response to execution by the processor, causes the mobile device to receive the at least one image of the installation location captured by the camera, generate a set of customized installation instructions for the access control hardware at the installation location based on the at least one image, and display the customized installation instructions on a graphical user interface of the mobile device.

In some embodiments, to generate the customized installation instructions may include to analyze the at least one image based on machine learning.

In some embodiments, to generate the customized installation instructions may include to analyze the at least one image to determine at least one of whether a hardware template is in a proper location at the installation location, whether an existing hole pattern at the installation location is compatible with a retrofit access control hardware component, a proper electrical wiring configuration at the installation location for the access control hardware, or a wireless communication environment of a physical environment of the installation location.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Figure 1:
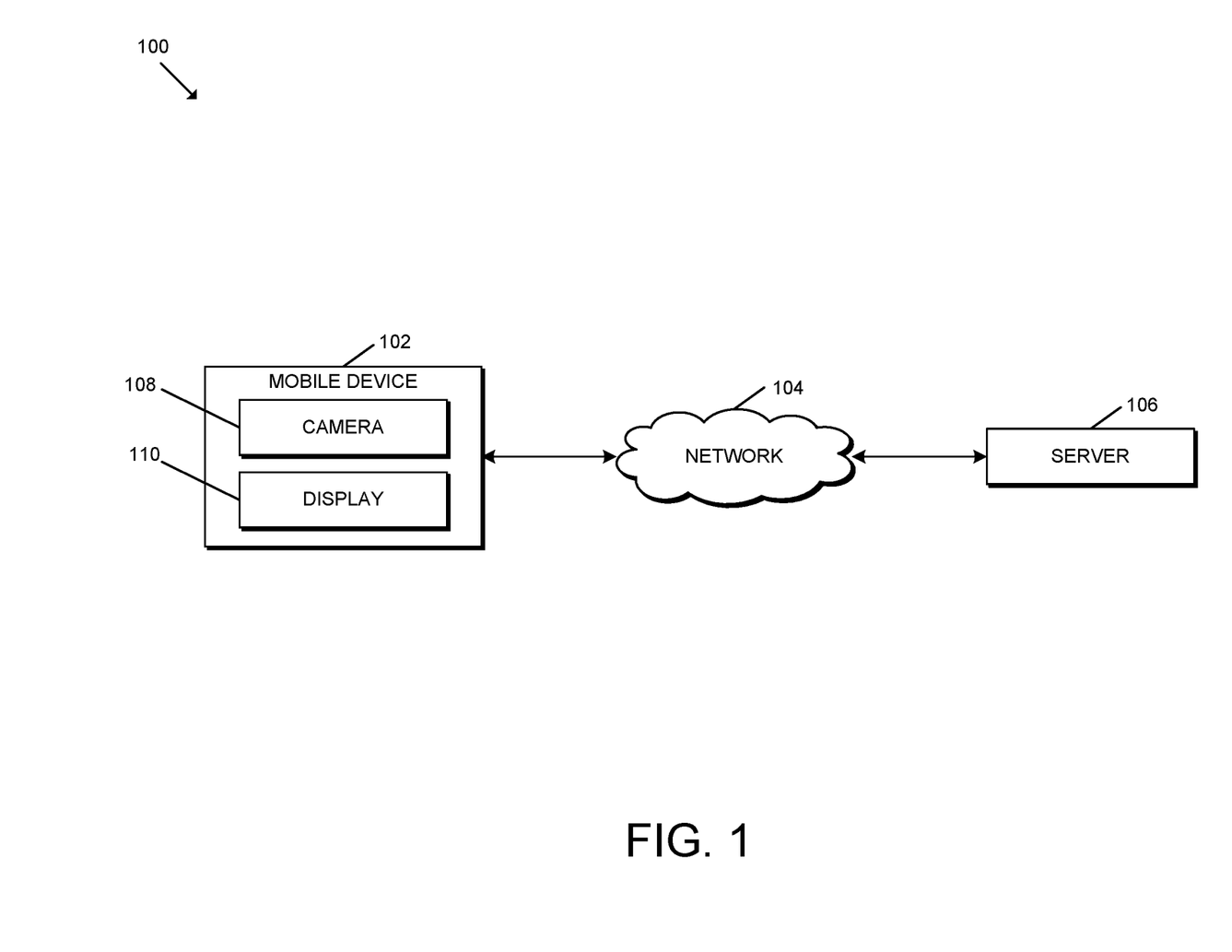
FIG. 1 is a simplified block diagram of at least one embodiment of a system for leveraging machine learning for the customized installation of access control hardware.

Referring now to FIG. 1, in the illustrative embodiment, as system 100 for leveraging machine learning for the customized installation of access control hardware is shown. The illustrative system 100 includes a mobile device 102, a network 104, and a server 106. Further, the illustrative mobile device 102 includes at least one camera 108 and at least one display 110. The techniques described herein allow a user (e.g., technician or end user) to use the camera 108 of the mobile device 102 to capture images of an installation location for access control hardware, leverage machine learning technologies to analyze the images, and present instructions to the user regarding how to install the access control hardware based on the user's unique installation circumstances. Installation instructions may be customized to the user's particular situation using computer vision and machine learning. Further, in some embodiments, the mobile device 102 may request user feedback during the installation process (e.g., to determine whether the user is having any problems) and provide customized instructions based on the user's feedback (e.g., requesting further images, providing specific instructions, etc.).

It should be appreciated that the mobile device 102 and/or the server 106 may be embodied as any type of device or collection of devices suitable for performing the functions described herein. More specifically, in the illustrative embodiment, the mobile device 102 may be embodied as any type of device capable of capturing images and displaying information for a user of the mobile device 102. Although the camera 108 and the display 110 are described herein as forming a portion of the mobile device 102, it should be appreciated that in other embodiments the camera 108 and/or the display 110 may be separate from but communicatively coupled to the mobile device 102 (e.g., as a peripheral device).

The mobile device 102 may include an application that enables the mobile device 102 to capture images, process the images, and provide instructions to the user. It should be appreciated that the application may be embodied as any suitable application for performing the functions described herein. For example, in some embodiments, the application may be embodied as a mobile application (e.g., smartphone application). In some embodiments, it should be appreciated that the application may serve as a client-side user interface for a web-based application or service of the server 106. As such, in some embodiments, the server 106 may process various data and/or perform various functions described herein in reference to the mobile device 102. Further, as described herein, in some embodiments, the mobile device 102 may be configured to transmit images/video to the server 106 for analysis, which may transmit results of the analysis (e.g., including installation instructions) back to the mobile device 102 for display to the user.

The camera 108 may be embodied as any type of device capable of capturing one or more images discretely or in a stream. For example, the camera 108 may include one or more two-dimensional (2D) cameras, three-dimensional (3D) cameras, and/or video cameras. Although the camera 108 is described herein generally as including image sensors that captured the visual light spectrum, it should be appreciated that the camera 108 may be configured to capture waves/signals in the non-visual light spectrum in other embodiments. Although the camera 108 is primarily described herein in the singular, it should be appreciated that the mobile device 102 may include multiple cameras 108 in other embodiments and the techniques described herein apply equally well to such an embodiment.

The display 110 may be embodied as any type of device capable of displaying installation instructions on a graphical user interface for a user of the mobile device 102. For example, in some embodiments, the display 110 may include a touchscreen display. Although the display 110 is primarily described herein in the singular, it should be appreciated that the mobile device 102 may include multiple displays 110 in other embodiments and the techniques described herein apply equally well to such an embodiment. It should be further appreciated that, in some embodiments, the mobile device 102 may include additional and/or alternative mechanisms to provide installation instructions to the user. For example, in some embodiments, the mobile device 102 may provide audible installation instructions via a speaker of the mobile device 102 and/or other types of feedback/instructions to the user (e.g., tactile feedback, haptic feedback, and/or other types of feedback/instructions).

The network 104 may be embodied as any type of communication network capable of facilitating communication between the various devices of the system 100. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof.

The server 106 may be embodied as any type of device(s) capable of performing the functions described herein. In the illustrative embodiment, the server 106 may be configured to process one or more images captured by the mobile device 102, for example, using computer vision, machine learning, artificial intelligence, and/or other techniques. In some embodiments, the mobile device 102 and the server 106 may cooperatively perform one or more of the functions of the processing system of the mobile device 102 described herein. For example, in some embodiments, the processing system of the mobile device 102 may perform some processing (e.g., less computationally- and/or data-intensive processing), whereas the processing system of the server 106 may perform other processing (e.g., more computationally- and/or data-intensive processing).

It should be further appreciated that, although the server 106 is described herein as a computing device outside of a cloud computing environment, in other embodiments, the server 106 may be embodied as a cloud-based device or collection of devices within a cloud computing environment. Further, in cloud-based embodiments, the server 106 may be embodied as a server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server 106 described herein. For example, when an event occurs (e.g., data is transferred to the server 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of access control data is made (e.g., via an appropriate user interface to the server 106), the appropriate virtual function(s) may be executed to perform the actions before eliminating the instance of the virtual function(s).

As described in greater detail below, the mobile device 102 and/or the server 106 may apply various computer vision algorithms, filters, and/or techniques to generate processed versions of the captured images and/or reformatted versions thereof. For example, in some embodiments, the mobile device 102 and/or the server 106 may utilize image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), thresholding/voting algorithms, and/or other suitable algorithms useful in determining characteristics of the access control hardware and/or installation location. Further, in some embodiments, the mobile device 102 and/or the server 106 may leverage machine learning techniques to perform the functions described herein (e.g., to better ascertain the characteristics of the access control hardware and/or installation location for customized installation instructions). For example, in some embodiments, the mobile device 102 and/or the server 106 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

It should be appreciated that each of the mobile device 102 and/or the server 106 may be embodied as a computing device/system similar to the computing system 200 described below in reference to FIG. 2. For example, in the illustrative embodiment, one or more of the mobile device 102 and/or the server 106 may include a processing device 202 and a memory 206 having stored thereon operating logic 208 for execution by the processing device 202 for operation of the corresponding device.

Figure 2:
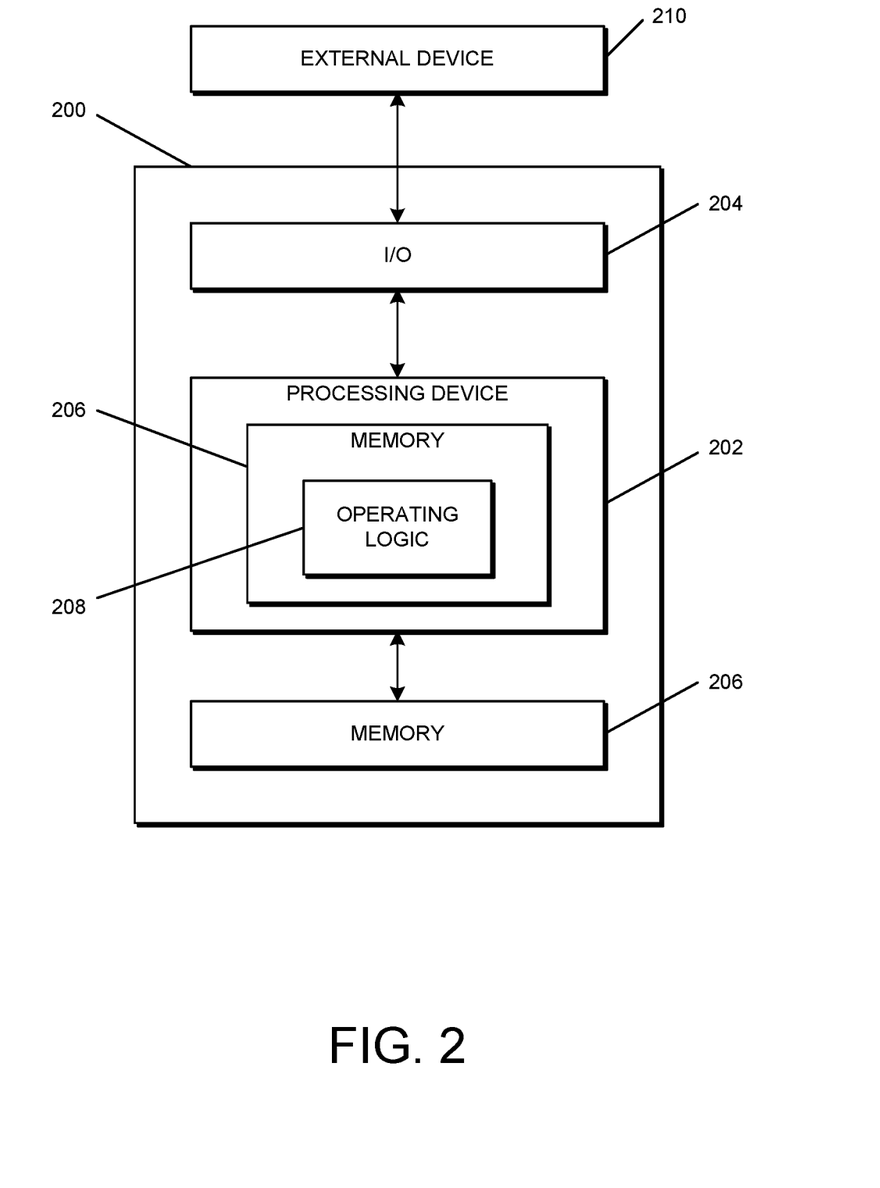
FIG. 2 is a simplified block diagram of at least one embodiment of a computing system.

Referring now to FIG. 2, a simplified block diagram of at least one embodiment of a computing system 200 is shown. The illustrative computing system 200 depicts at least one embodiment of a mobile device and/or server that may be utilized in connection with the mobile device 102 and/or the server 106 illustrated in FIG. 1. Depending on the particular embodiment, the computing system 200 may be embodied as a mobile computing device, server, desktop computer, laptop computer, tablet computer, notebook, netbook, Ultrabook™, cellular phone, smartphone, wearable computing device, personal digital assistant, Internet of Things (IoT) device, control panel, router, gateway, and/or any other computing, processing, and/or communication device capable of performing the functions described herein.

The computing system 200 includes a processing device 202 that executes algorithms and/or processes data in accordance with operating logic 208, an input/output device 204 that enables communication between the computing system 200 and one or more external devices 210, and memory 206 which stores, for example, data received from the external device 210 via the input/output device 204.

The input/output device 204 allows the computing system 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing system 200. For example, in various embodiments, the external device 210 may be embodied as the mobile device 102 and/or the server 106. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing system 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing system 200 may form a portion of a system-on-a-chip (SoC) and be incorporated on a single integrated circuit chip.

In some embodiments, various components of the computing system 200 (e.g., the processing device 202 and the memory 206) may be communicatively coupled via an input/output subsystem, which may be embodied as circuitry and/or components to facilitate input/output operations with the processing device 202, the memory 206, and other components of the computing system 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 200 may include other or additional components, such as those commonly found in a typical computing device (e.g., various input/output devices and/or other components), in other embodiments. It should be further appreciated that one or more of the components of the computing system 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing system 200 may include multiple processing devices 202, I/O devices 204, and/or memories 206 in other embodiments. Further, in some embodiments, more than one external device 210 may be in communication with the computing system 200.

Figure 3:
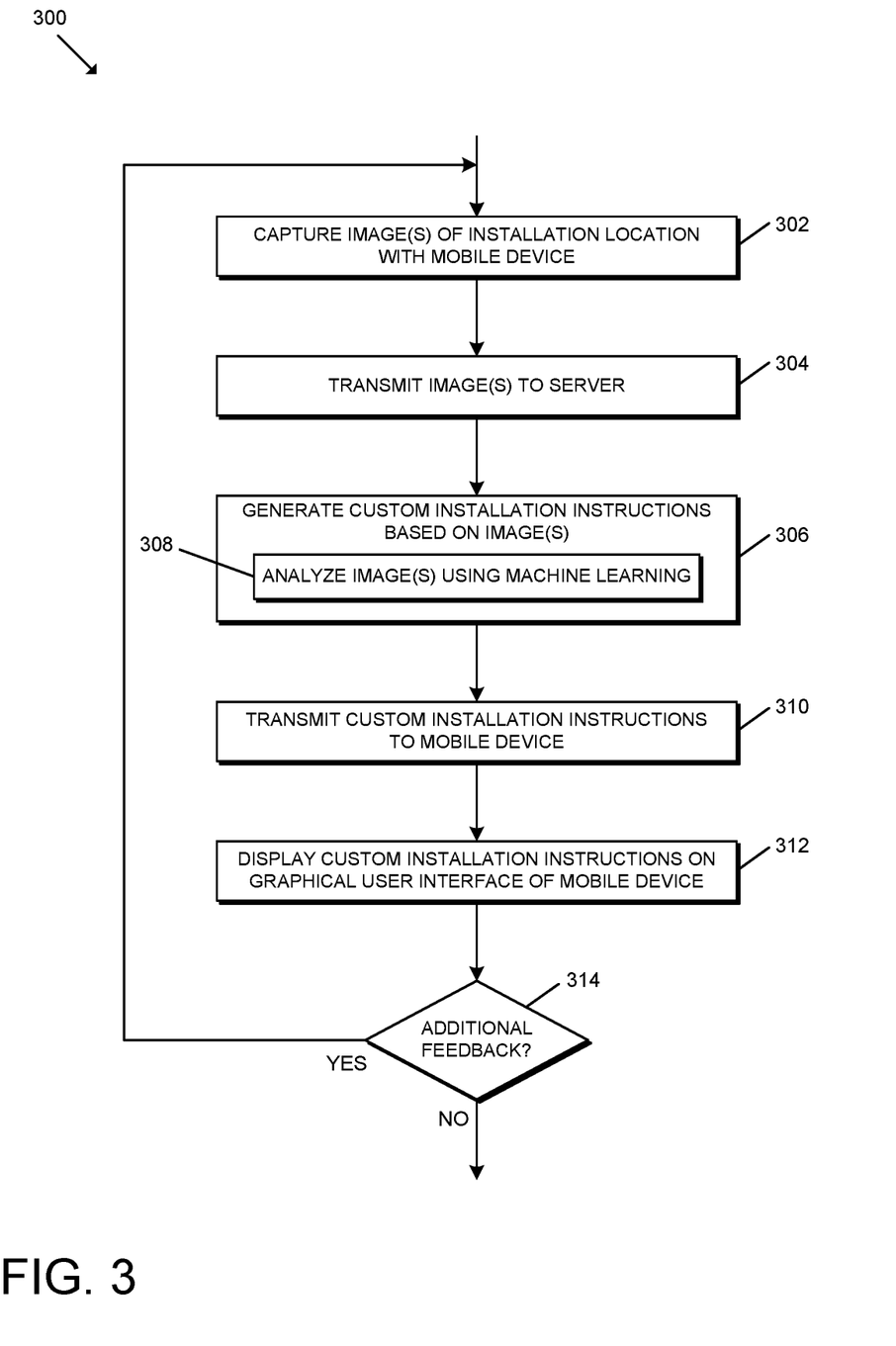
FIG. 3 is a simplified flow diagram of at least one embodiment of a method for leveraging machine learning for the customized installation of access control hardware.

Referring now to FIG. 3, in use, the system 100 (e.g., in conjunction with a user) may execute a method 300 for leveraging machine learning for the customized installation of access control hardware. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which a user captures one or more images/video of an installation location for access control hardware using the mobile device 102. For example, the user may capture images of the bare prep of a door/frame, which may depict the bore(s) (e.g., for a tubular lock, cylindrical lock, mortise lock, etc.), strike pocket, depth of the bores/pockets, backset distance, hinge pocket, and/or other characteristics of an access control hardware installation. Further, in some embodiments, the user may capture images before a prior lock has been removed and/or subject to installation of one or more features of the access control hardware.

In block 304, the mobile device 102 transmits one or more images to the server 106 for analysis. In the illustrative embodiment, the mobile device 102 may transmit the images to the server 106 for analysis due, for example, to the often computationally intensive nature of computer vision and/or machine learning algorithms. However, it should be appreciated that, in other embodiments, the mobile device 102 may perform one or more of the analyses described herein in reference to the server 106 (e.g., in conjunction with or in the alternative to the server 106 performing those analyses).

In block 306, the server 106 analyzes the image(s) received from the mobile device 102 and generates custom installation instructions for the access control hardware based on the analysis of the image(s). In doing so, in block 308, the server 106 may analyze the image(s) using one or more computer vision, machine learning, and/or artificial intelligence techniques. For example, as indicated above, the server 106 may utilize various computer vision techniques including image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), thresholding/voting algorithms, and/or other suitable algorithms useful in determining characteristics of the access control hardware and/or installation location. Further, in some embodiments, the server 106 may leverage machine learning and/or artificial intelligence techniques to perform the functions described herein (e.g., to better ascertain the characteristics of the access control hardware and/or installation location for customized installation instructions). For example, the server 106 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

It should be appreciated that the features of the installation location and/or access control hardware identified by the server 106 based on an analysis of the image(s) may vary depending on the particular embodiment. Similarly, the custom installation instructions for the access control hardware may vary depending on the particular access control hardware component(s) to be installed and the unique installation circumstances for the user's particular installation. In some embodiments, the server 106 may generate customized step-by-step instructions set based on the analysis. Further, in some embodiments, the server 106 may identify and/or provide access (e.g., via a hyperlink) to one or more images, videos, and/or installation instructions customized to the user's circumstances (e.g., how-to videos/images). Various examples and use cases of such features and/or instructions are described in greater detail below.

In block 310, the server 106 transmits the one or more custom instructions to the mobile device 102. In block 312, the mobile device 102 displays the custom installation instructions on a graphical user interface of the mobile device 102. As indicated above, the mobile device 102 may, additionally or alternatively, provide the custom installation instructions to the user via another mode of communication (e.g., speaker, tactile feedback, haptic feedback, etc.). In block 314, the mobile device 102 determines whether to obtain additional feedback. For example, in some embodiments, the application of the mobile device 102 may prompt the user to indicate whether installation was successful or further updates to the customized installation instructions are required (e.g., in response to partial/full installation of one or more components at the installation location). If there is additional feedback, the method 300 returns to block 302 in which the mobile device 102 again captures one or more images of the installation location and proceeds to execute the method 300.

Although the blocks 302-314 are described in a relatively serial manner, it should be appreciated that various blocks of the method 300 may be performed in parallel in some embodiments.

As indicated above, the techniques described herein may be used to identify various different features of the installation location and/or access control hardware, and various different types of custom installation instructions may be provided. For example, based on an analysis of the image(s), the server 106 may determine whether a hardware template is in a proper location at the installation location, determine whether an existing hole pattern at the installation location is compatible with a retrofit access control hardware component, determine a door thickness and/or backset at the installation location, determine a proper electrical wiring configuration at the installation location for the access control hardware, determine a wireless communication environment of a physical environment of the installation location, determine one or more access control hardware components (e.g., from a plurality of possible components) captured in at least one image to use for a particular installation step of the access control hardware, and/or determine other aspects associated with installation of the access control hardware at the installation location.

More specific embodiments are further described below. It should be appreciated that the specific examples are provided by way of example only, and the techniques described herein may be used for various other circumstances.

In some embodiments, the server 106 may determine whether a template for access control hardware (e.g., door lock, exit device, door closer, and/or other access control hardware) is located in the proper location based on one or more images of the installation location. In many circumstances, a user or other installer may have the template positioned in the wrong location, drill holes in the locations identified on the improperly positioned template, and have to drill additional holes after learning that the initial positioning of the template was not correct. As such, the door and/or frame often becomes "Swiss cheese" and the integrity of the surrounding structure is compromised. As such, by determining whether a template is in the proper location and, if not, adjusting its location prior to drilling, the user may avoid these installation concerns.

In some embodiments, the server 106 may perform a retrofit analysis based on one or more images of the installation location. For example, with a lock, exit device, closer, and/or other access control hardware removed from the installation location, the server 106 may determine whether the existing hole pattern (e.g., bore, backset, etc.) is appropriate for the installation of specific new access control hardware and, if not, where the user should drill additional holes or otherwise modify the existing structure at the installation location.

In some embodiments, the server 106 may determine the appropriate electrical wiring configuration for access control hardware (e.g., for a panel interface module, power supply, mag lock, etc.) based on one or more images of the access control hardware at the installation location. For example, the user may select the particular access control hardware and desired configuration via the application on the mobile device 102, and the mobile device 102 and/or server 106 may identify the particular ports at which specific electrical wires are to be connected. Similar techniques may be employed to troubleshoot existing wiring configurations when the access control hardware is not operating properly after installation.

In some embodiments, the mobile device 102 may capture an image of a label on a door and/or frame at an installation location to identify the proper access control hardware associated with that installation location (e.g., to ensure that the hardware is compatible with the installation location). For example, such features may help to ensure that users with fire rated doors and frames order and install appropriately fire rated hardware in association with that installation location. Similarly, in some embodiments, the mobile device 102 may capture one or more images of existing door prep to determine hardware that is appropriate for the installation (e.g., without scanning a label). Further, in some embodiments, the server 106 may determine whether access control hardware is ADA compliant (or otherwise regulatory compliant) and/or whether particular components are required for such compliance.

In some embodiments, the server 106 may determine whether proper fasteners have been used in conjunction with the installation of the access control hardware and/or identify incorrect fasteners based on one or more images of the access control hardware at the installation location. Similarly, in some embodiments, the appropriate components may be determine proactively. For example, in some embodiments, the server 106 may analyze one or more images of a door and/or strike prep to determine what parts/components the user will need for a successful installation (e.g., electrical and/or mechanical components). Further, in some embodiments, the mobile device 102 may capture one or more images of access control hardware purported to be the proper hardware to assess whether that hardware is in fact compatible with the installation location. For example, the server 106 may identify the various hardware components and/or features thereof (e.g., left-handed, right-handed, etc.) and determine whether those components are appropriate prior to installation. Further, it should be appreciated that, in some embodiments, the parts may be obtained from a parts kit (e.g., a universal or common parts kit) in which some of the parts apply to the installation and other parts are inapplicable. As such, the server 106 may determine which components are the correct components for the particular installation.

In some embodiments, the mobile device 102 may capture video and/or a series of images of the access control hardware that depicts the functioning of the access control hardware, for example, in order to provide customized troubleshooting steps. In other words, rather than the analysis of isolated static snapshots, the system 100 may analyze real-time video to ensure that the installation is correct. For example, such features may be employed to ensure that a door closer is adjusted correctly, detect door sag that is preventing proper latch engagement, and/or detection and correction of other complex door issues.

In some embodiments, the mobile device 102 may capture one or more images of a serial number of an access control hardware component to determine various aspects associated with the hardware, installation location, or otherwise. For example, in some embodiments, the serial number may be used to determine whether warranties are available and/or unique aspects associated with the access control hardware component (e.g., material type, finish, etc.).

In some embodiments, the server 106 may determine the thickness of the door based on one or more images of the installation location, which may be used for ordering and/or installations involving adjustable pieces. For example, some lock devices may include one or more adjustable components (e.g., a ring) that may be varied depending on the thickness of the door (e.g. by adjusting the components to specific settings). If the adjustments are not correct, the lock device may be too tight and squeeze the door such that the mechanics do not operate properly, or the lock device may be too lose such that the entire lock device is loose on the door posing a security risk.

In some embodiments, the server 106 may determine whether the door/frame is square, determine a floor gap, and/or determine a door gap based on one or more images of the installation location, which may assist with identifying various door conditions (e.g., door sag, door sticking, etc.).

In some embodiments, the server 106 may evaluate the installation location and its vicinity (e.g., by panning around the room(s)) for wireless lock communication challenges (e.g., recessed door, drop ceiling grip, adjacent lockers, etc.) based on one or more images of the installation location. It should be appreciated that various conditions cause interference with wireless signals. For example, images identifying cinder block walls, metal walls, metal cabinets, and/or IT closets in the vicinity of the installation location may pose a challenge for wireless communication. Further, in some buildings, stucco walls are used, which often involve a metal mesh that essentially acts as a Faraday cage, thereby causing significant signal interference. Machine learning and artificial intelligence techniques may be used to continuously learn the features that are likely to result in signal interference over time.

What is claimed is:

1. A method of customized installation of access control hardware by using machine learning, the method comprising:
   capturing, by a camera of a mobile device, at least one image of a bare preparation of a door and frame at an installation location that is to receive access control hardware;
   transmitting, by the mobile device, the at least one image to a server;
   analyzing, by the server, the at least one image of the installation location for the access control hardware using computer vision;
   generating, by the server in response to analyzing the at least one image captured by the camera, a set of customized installation instructions for the access control hardware at the installation location based on machine learning of the installation location different from the computer vision;
   transmitting, by the server, the set of customized installation instructions for the access control hardware at the installation location to the mobile device; and
   displaying the customized installation instructions on a graphical user interface of the mobile device.

2. The method of claim 1, wherein analyzing the at least one image comprises determining whether a hardware template for drilling holes is in a proper location at the installation location based on the at least one image.

3. The method of claim 1, wherein analyzing the at least one image comprises determining whether an existing hole pattern at the installation location is compatible with a retrofit access control hardware component based on the at least one image.

4. The method of claim 1, wherein analyzing the at least one image comprises determining a backset at the installation location based on the at least one image.

5. The method of claim 1, wherein analyzing the at least one image comprises determining a proper electrical wiring configuration at the installation location for the access control hardware based on the at least one image.

6. The method of claim 1, wherein analyzing the at least one image comprises determining a wireless communication environment of a physical environment of the installation location based on the at least one image; and
   further comprising continuously learning features that result in signal interference based on at least the wireless communication environment of the physical environment of the installation location.

7. The method of claim 1, wherein analyzing the at least one image comprises determining one or more access control hardware components of a plurality of access control hardware components in a parts kit captured in the at least one image to use for a particular installation step of the access control hardware.

8. The method of claim 1, wherein capturing the at least one image comprises capturing video of the installation location.

9. A system, comprising:
   a camera configured to capture at least one image of a bare preparation of a door and a frame at an installation location that is to receive access control hardware;
   a server; and
   a mobile device comprising a processor and a memory having a plurality of instructions stored thereon that, in response to execution by the processor, causes the mobile device to receive the at least one image captured by the camera and transmit the at least one image to the server;
   wherein the server is configured to:
     receive the at least one image from the mobile device;
     analyze the at least one image using computer vision;
     generate, in response to analysis of the at least one image using computer vision, a set of customized installation instructions for the access control hardware at the installation location based on machine learning of the installation location different from the computer vision; and
     transmit the set of customized installation instructions to the mobile device; and
   wherein the plurality of instructions further causes the mobile device to display the customized installation instructions on a graphical user interface of the mobile device.

10. The system of claim 9, wherein to analyze the at least one image comprises to determine whether a hardware template is in a proper location at the installation location.

11. The system of claim 9, wherein to analyze the at least one image comprises to determine whether an existing hole pattern at the installation location is compatible with a retrofit access control hardware component.

12. The system of claim 9, wherein to analyze the at least one image comprises to determine at least one of a door thickness or a backset at the installation location.

13. The system of claim 9, wherein to analyze the at least one image comprises to determine a proper electrical wiring configuration at the installation location for the access control hardware.

14. The system of claim 9, wherein to analyze the at least one image comprises to determine a wireless communication environment of a physical environment of the installation location.

15. A mobile device, comprising:
a camera configured to capture at least one image of a bare preparation for a door and a frame and an installation location that is to receive access control hardware;
a processor; and
a memory having a plurality of instructions stored thereon that, in response to execution by the processor, causes the mobile device to:
receive the at least one image captured by the camera;
analyze the at least one image using computer vision;
generate, in response to analysis of the at least one image of the installation location using computer vision, a set of customized installation instructions for the access control hardware at the installation location based on machine learning of the installation location different from the computer vision; and
display the customized installation instructions on a graphical user interface of the mobile device.

16. The mobile device of claim 15, wherein to analyze the at least one image comprises to determine at least one of:
whether a hardware template is in a proper location at the installation location;
whether an existing hole pattern at the installation location is compatible with a retrofit access control hardware component;
a proper electrical wiring configuration at the installation location for the access control hardware; or
a wireless communication environment of a physical environment of the installation location.

17. The method of claim 1, wherein generating the set of customized installation instructions comprises generating the set of customized installation instructions for the access control hardware at the installation location based on a neural network or deep learning.

18. The method of claim 1, wherein:
the at least one image of the bare preparation for the door and the frame captured by the camera depicts bores and pockets in the door and frame and depths for the same; and
analyzing the image includes analyzing a hole pattern formed by the bores and pockets to determine a compatibility of the hole pattern for the access control hardware.

19. The system of claim 9, wherein:
the at least one image of the bare preparation for the door and the frame captured by the camera depicts bores and pockets in the door and frame and depths for the same; and
analyzing the image includes analyzing a hole pattern formed by the bores and pockets to determine a compatibility of the hole pattern for the access control hardware.

20. The mobile device of claim 15, wherein:
the at least one image of the bare preparation for the door and the frame captured by the camera depicts bores and pockets in the door and frame and depths for the same; and
analyzing the image includes analyzing a hole pattern formed by the bores and pockets to determine a compatibility of the hole pattern for the access control hardware.

* * * * *